(12) United States Patent  (10) Patent No.: US 8,226,325 B1
Pierce, Jr.  (45) Date of Patent: Jul. 24, 2012

(54) WAVE SUPPRESSOR AND SEDIMENT COLLECTION SYSTEM

(76) Inventor: Webster Pierce, Jr., Cut Off, LA (US)

( * ) Notice: Subject to any disclaimer, the term of this patent is extended or adjusted under 35 U.S.C. 154(b) by 266 days.

(21) Appl. No.: 12/576,359

(22) Filed: Oct. 9, 2009

(51) Int. Cl.
   *E02B 3/04* (2006.01)
(52) U.S. Cl. ................. 405/30; 405/15; 405/21; 405/25
(58) Field of Classification Search ............. 405/15, 405/21, 23, 25, 29, 30, 73, 74, 80, 87; 137/512.1, 137/527.8; 210/162, 170.09, 170.1, 170.11
   See application file for complete search history.

(56) References Cited

U.S. PATENT DOCUMENTS

| | | |
|---|---|---|
| 3,373,568 A | 3/1968 | Hornbostel, Jr. |
| 3,387,458 A | 6/1968 | Jarlan |
| 3,632,508 A | 1/1972 | Girden |
| 4,367,978 A | 1/1983 | Schaaf et al. |
| 4,479,740 A | 10/1984 | Schaaf et al. |
| 4,708,521 A | 11/1987 | Kocourek |
| 4,711,598 A | 12/1987 | Schaaf et al. |
| 4,978,247 A | 12/1990 | Lenson |
| 5,150,988 A * | 9/1992 | Powell et al. ............. 405/128.5 |
| 5,439,316 A * | 8/1995 | Richardson .................. 405/114 |
| 6,955,759 B2 * | 10/2005 | Patrick et al. ................. 210/162 |
| 7,029,200 B1 | 4/2006 | Cravens |
| 7,165,912 B2 | 1/2007 | Herzog |
| 7,507,056 B2 | 3/2009 | Spry |
| 2009/0148243 A1 * | 6/2009 | McGinn et al. ........... 405/302.6 |
| 2009/0154996 A1 | 6/2009 | Liner |

* cited by examiner

*Primary Examiner* — David Bagnell
*Assistant Examiner* — Sean Andrish
(74) *Attorney, Agent, or Firm* — Garvey, Smith, Nehrbass & North, L.L.C.; Gregory C. Smith; Julia M. FitzPatrick

(57) ABSTRACT

A transportable wave suppressor and sediment collection (WSSC) system, including a method of installing same, the system installed to suppress wave action and provide land restoration along the shore of a body of water, such as a coastline, which includes a plurality of interconnected sections of the system, each section including a base, a forward wall, and a rear wall, having a plurality of fluid flow pipes extending from the forward wall to the rear wall, for allowing water including sediment to flow into the pipes at the forward wall and exit the pipes at the rear wall. There is further provided a one-way valve member at the rear wall exit of each pipe, so that water carrying sediment cannot return through the pipe as the wave action recedes from the coastline. There is provided a flow opening including a weir between multiple sections so that water can flow therethrough.

19 Claims, 15 Drawing Sheets

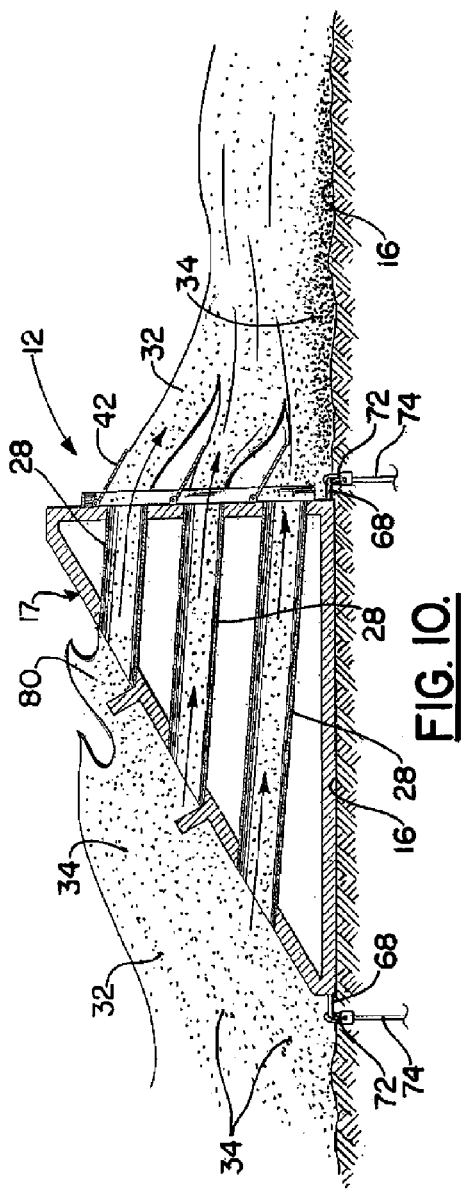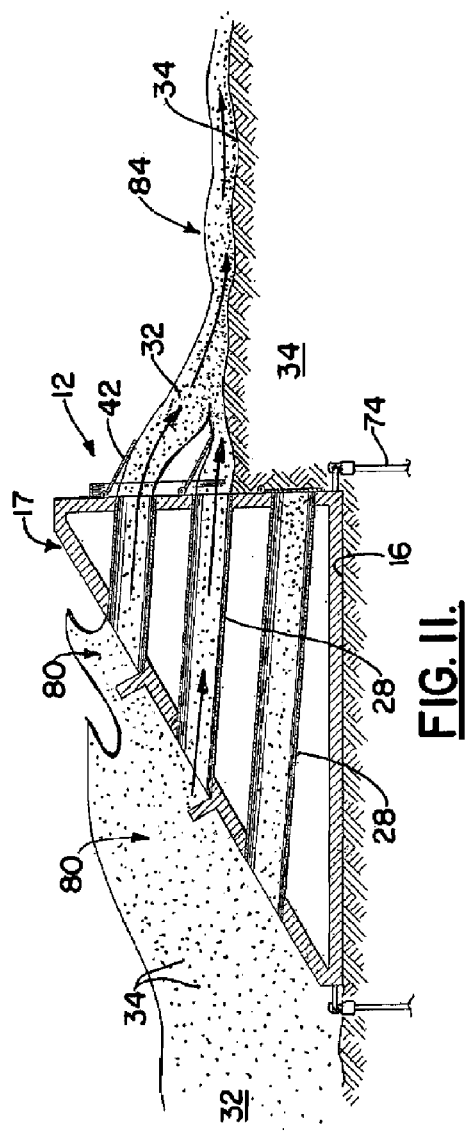

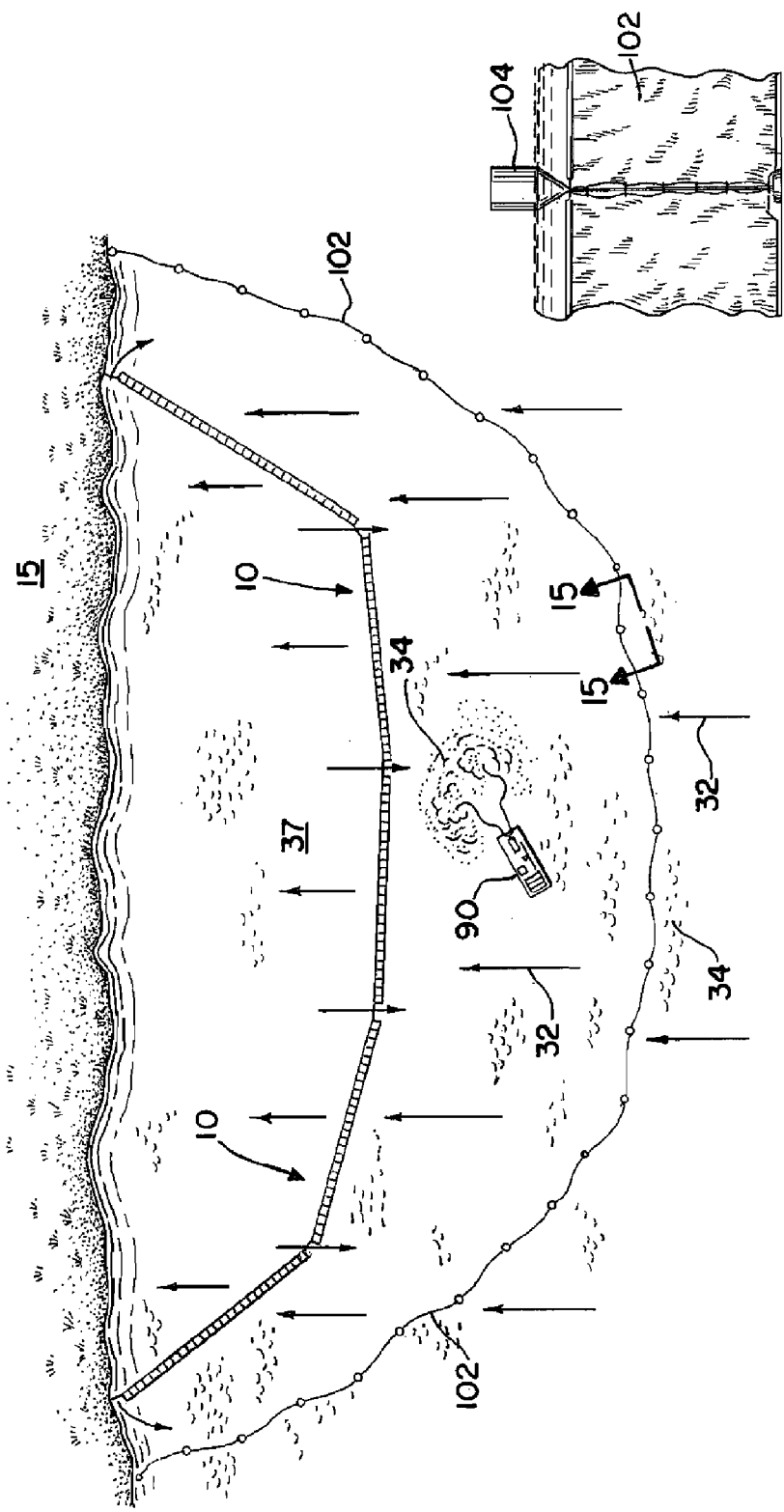
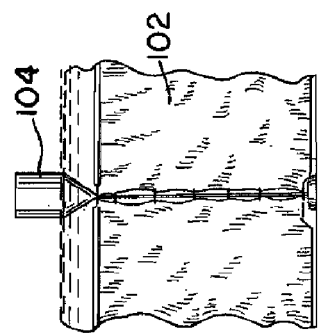
FIG. 14.
FIG. 15.

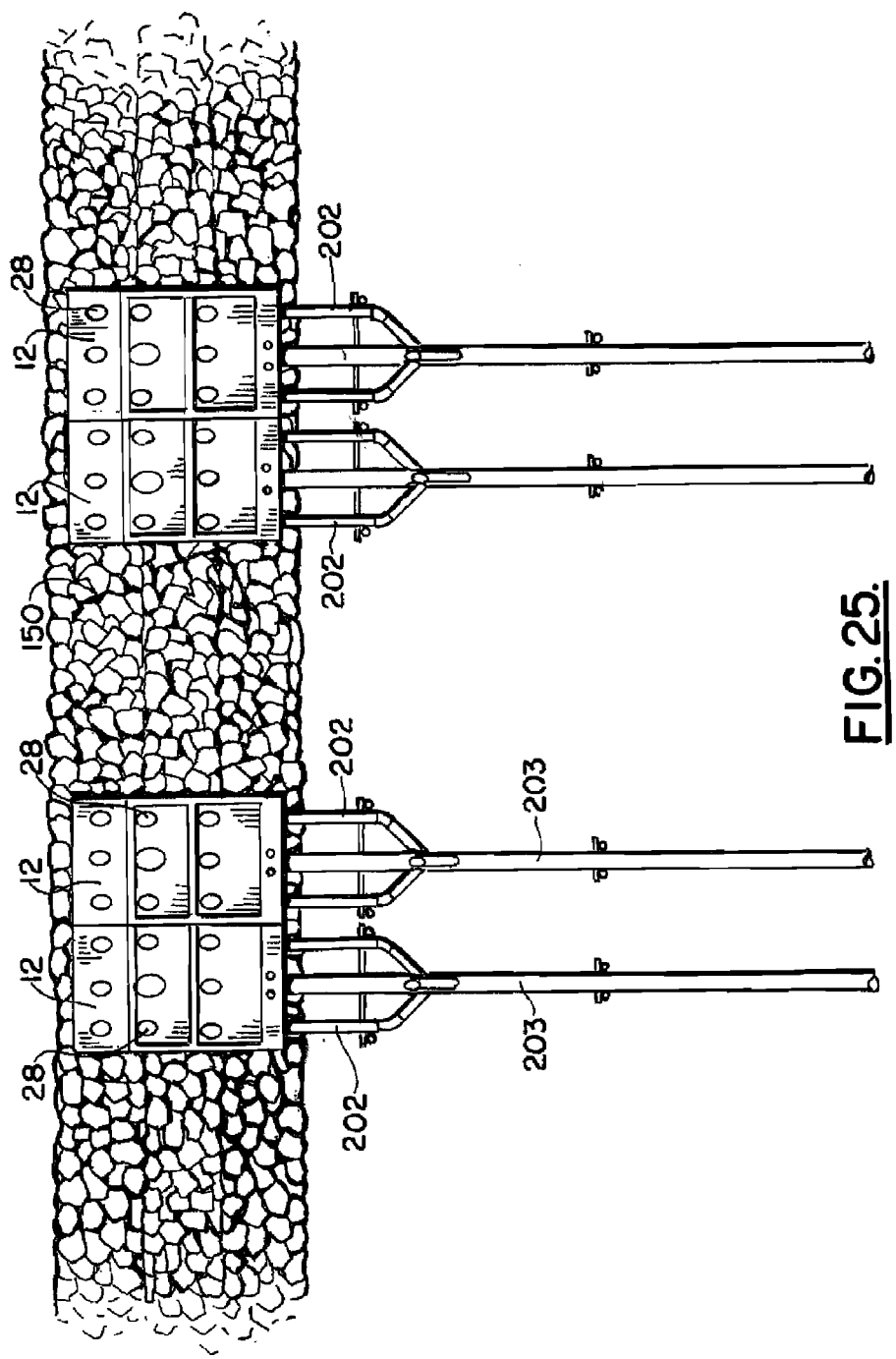

WAVE SUPPRESSOR AND SEDIMENT COLLECTION SYSTEM

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to protection from coastline erosion caused by wave action or tidal surge and the restoration of coastline lost from such wave action or tidal surge activity. More particularly, the present invention relates to a wave suppressor and sediment collection system (sometimes referred to as the WSSC System) which is transportable and can be installed along a coastline which provides a sufficient barrier to disrupt the tidal wave flow into the coastline while at the same time allowing sediment to be carried through the system by the wave action and water currents and to be trapped and deposited at points between the system and the coastline to allow coastline restoration to occur.

2. General Background of the Invention

The loss of valuable coastline for states along the Gulf of Mexico, Atlantic Ocean and Pacific Ocean is a very serious problem. For example, using the Gulf of Mexico as an example, for thousands of years, the flow of the Mississippi during flood stages, carried rich soil and sediment into Louisiana and the result was the creation of a vast fertile Mississippi River delta region which was inhabitable and where crops could flourish. In recent times, with the discovery of oil and gas beneath the Louisiana coast, oil companies have built a vast system of canals in order to allow boats and self-contained drilling rigs to be transported inland in order to recover the oil and gas. This vast system of canals has allowed the intrusion of salt water into the lower delta, and by doing so has killed off thousands of acres of valuable marsh land, which had helped maintain the valuable soil in place. In addition, the marshland served as a first barrier against the onslaught of hurricanes and helped slow down the movement of the storms and reduce the storm surge before the storm reached habitable portions of the state.

However, with the loss of valuable marsh grass, the soil became susceptible to erosion, and consequently miles of valuable coastline were lost. It is estimated that coastal erosion by the flow of the tides on a daily basis results in a loss of many square miles of coastline. Furthermore, the reduction in the marsh land has resulted in the reduction of protection from hurricane storm surge and wind velocity. Many believe that Hurricane Katrina was a prime example of a hurricane that came ashore and because there was little marshland to hinder its winds and surge, resulted in the enormous amount of wind and water to be carried far inland.

Therefore, there is a need in two vital areas. The first is a system, such as was provided by the barrier islands years ago, which would hinder or reduce the surge of tidal water inland during normal tidal cycles, and also during storms, so that the surge does not damage the coastline. Second, there is a need for a system which would allow the wave action to move through the system, carrying with it tons of sand and other silt material, buoyant in the water, but the sand and silt being trapped between the system and the shoreline and forced to be deposited and increase the solid material which would eventually form additional coastline.

The following U.S. Patents are incorporated herein by reference:

TABLE

| PATENT NO. | TITLE | ISSUE DATE |
|---|---|---|
| 3,373,568 | System for Reclamation of Land | Mar. 19, 1968 |
| 3,387,458 | Seawall Structures | Jun. 11, 1965 |
| 3,632,508 | Method and Apparatus for Desilting and/or Desalting Bodies of Water | Jan. 4, 1972 |
| 4,367,978 | Device for Preventing Beach Erosion | Jan. 11, 1983 |
| 4,479,740 | Erosion Control Device and Method of Making and Installing Same | Oct. 30, 1984 |
| 4,708,521 | Beach Building Block | Nov. 24, 1987 |
| 4,978,247 | Erosion Control Device | Dec. 18, 1990 |
| 7,029,200 | Shoreline Erosion Barrier | Apr. 18, 2006 |
| 7,165,912 | Apparatus for Rebuilding a Sand Beach | Jan. 23, 2007 |
| 7,507,056 | Apparatus for Controlling Movement of Flowable Particulate Material | Mar. 24, 2009 |
| 2009/0154996 | Shoreline and Coastal Protection and Rebuilding Apparatus and Method | Jun. 18, 2009 |
| 4,711,598 | Beach Erosion Control Device | Dec. 9, 1997 |

BRIEF SUMMARY OF THE INVENTION

The system of the present invention solves the problems in a straightforward manner. In a first principal embodiment, what is provided is a transportable system to reduce tidal surge wave action and provide land restoration along the shore of a body of water, such as a coastline, which includes a plurality of interconnected sections of the system, each section including a base, a forward wall, and a rear wall, having a plurality of fluid flow pipes extending from the forward wall to the rear wall, for allowing water including sediment to flow into the pipes at the forward wall and exit the pipes at the rear wall. There is further provided a one-way valve member at the rear wall exit of each pipe, so that water carrying sediment cannot return through the pipe as the wave action recedes from the coastline. To allow water to return to the body of water, there is provided a flow opening including a weir between multiple sections so that water is able to flow therethrough. Each of the sections would be self-contained, and constructed of a material to allow each section to be floated or transported to a location, wherein material, such as water, or the like, can be pumped into each section resulting in the section to sink and rest on the floor of the body of water, with an upper portion of the section extending a distance above the water surface. The sections would be interconnected and anchored to the floor, so as to provide a continuous system, interrupted only by the water return outlets as stated earlier.

The systems described above would further provide inlet and outlet valves on each individual section for allowing material to be pumped into each section in order to sink each section as described earlier; and when sections have to be transported to another location the valving would allow the material to be pumped from each section, resulting in each section becoming buoyant and transportable or barged to another location to be reassembled into multi-sections as described earlier.

Further, it is foreseen that the forward wall of each section would include a shelf or shoulder extending outward below each row of water flow pipes so as to catch any sediment that may not flow through the pipes initially, but would be carried through by a subsequent wave action.

In another embodiment, the system as described above would include a secondary system stationed in the water ahead of the system, which would include one or multiple barges, each barge having an air compressor system, preferably powered by wind and solar energy, to buildup compressed air in tanks, and upon water reaching a certain level, automatically releasing the compressed air through openings at the ends of a plurality of air lines which would be able to rove along the water bottom, resulting in the pressurized air stirring and fluffing up sand and silt from the water bottom. This would provide a great amount of additional sand and silt becoming suspended in the water and being carried through the land restoration system and deposited between the system and the coastline, thus greatly increasing the amount of sediment built up between the system and the coastline.

It is foreseen that as sediment is built up, as described above, the entire system could be relocated to another position in order to build up sediment in another area. The entire system could stretch over a short distance, or it could stretch over miles of coastline, depending on the need in an area.

In the most simple embodiment of the system, it is foreseen that when a rock jetty or dam is constructed, as of the type which will dam the opening of the "Mr Go" Channel in South Louisiana, a plurality of flow pipes of the type described above could be positioned through the rock dam, so that some water carrying sediment could flow through the pipes, but not an amount to cause a tidal surge, and in doing so would be depositing sediment on the land side of the dam, so that over time sediment is deposited to the point of resulting in land accumulation.

Therefore, it is a principal object of the present invention to construct a device that would suppress the energy of a wave to effectively break down the energy in a wave; use the energy of the wave to help collect sediment; and use the energy of the wave to help rebuild coastal south Louisiana.

It is a second principal object of the present invention to protect the environment by helping to collect sediment and protect the existing shore line, and helping to collect sediment and protect the existing levee systems exposed to open water.

It is a third principal object of the present invention to speedup sediment recovery by holding and preventing the sediment from leaving the confined area and returning to open water and be lost forever.

It is a fourth principal object of the present invention to act as secondary sediment barriers by confining sediment to certain areas, and using this newly developed method of keeping sediment suspended so as to take advantage of the energy found in the waves.

It is a fifth principal object of the present invention to provide a barrier made from concrete or recycled rubber material which is designed to float or made of a light material is (HDPE) high density poly ethylene, or lightweight concrete designed to float, or that can be made from recycled rubber, such as used tires, or use the most economical material.

It is a sixth principal object of the present invention to recycle the barrier device by removing the water from inside the barrier and float or barge to a new site and use it again.

It is a seventh principal object of the present invention to use the barrier wall as sediment retainer when sediment is pumped from a known source.

It is an eighth principal object of the present invention to provide a designated pipeline used to move sediment from a river by retaining most of the sediment if not all of it; stopping erosion of newly deposited material; and stopping polluting and contaminating areas that otherwise are not designed to receive any sediment.

It is a ninth principal object of the present invention to provide weirs strategically located to maximize the sediment recovery; and It is a tenth principal object of the present invention to be an island builder by completely surrounding an area, letting the waves bring the sediment and building up the island.

It is a further principal object of the present invention to provide a system which will be constructed and applied in such a way as to have no adverse effect of the ecology of the environment the WSSC System is placed into.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 10 is another side cutaway of the preferred embodiment of the WSSC System of the present invention illustrating water carrying sediment through the system;

FIG. 11 is a side cutaway of the preferred embodiment of the WSSC System of the present invention illustrating sediment buildup to the rear of the system;

FIG. 14 is an aerial view of the sediment being stirred up by the system described in FIG. 13;

FIG. 15 is a view along lines 15-15 in FIG. 14, which illustrates one of the buoys used to support the net surrounding the sediment stirring system illustrated in FIG. 13;

FIG. 25 illustrates a second embodiment of the WSSC System as it would be installed within a rock jetty.

DETAILED DESCRIPTION OF THE INVENTION

Figure 12A:
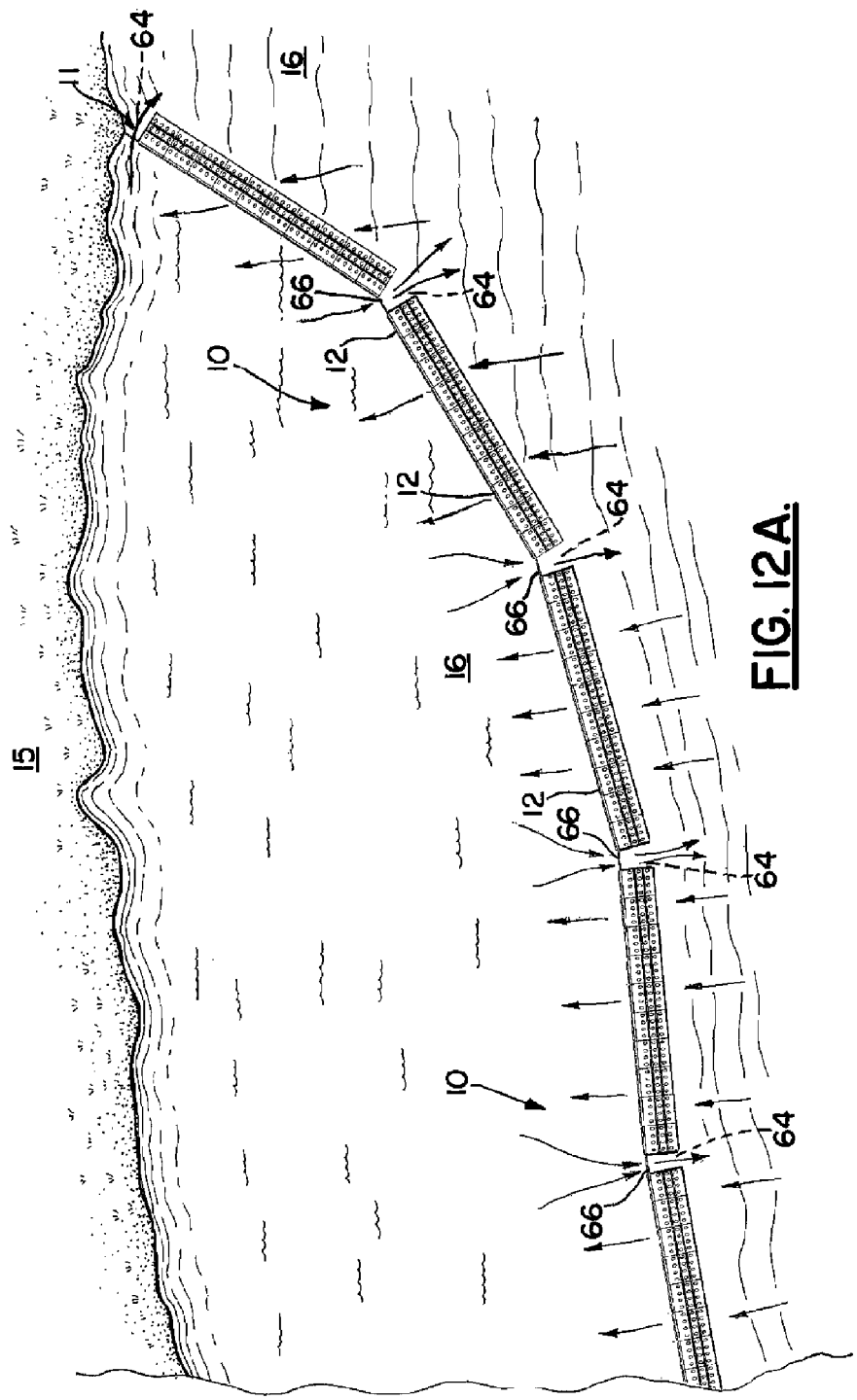
FIG. 12A is an aerial view of the WSSC System in place along a shoreline in a body of water.

FIGS. 1 through 25 illustrate the preferred embodiment of the Wave Suppressor and Sediment Collection (WSSC) System 10 of the present invention, as seen in overall aerial view in FIG. 12A, where the system 10 is in place near a shoreline 15. However, for details of the WSSC system 10, reference is made to various drawing FIGS. 1 through 17, while FIGS. 18 through 25 illustrate a second embodiment of the WSSC System positioned within a rock jetty. The WSSC System in place near a shore line will be described initially as set forth in FIGS. 1 through 17.

Figure 1:
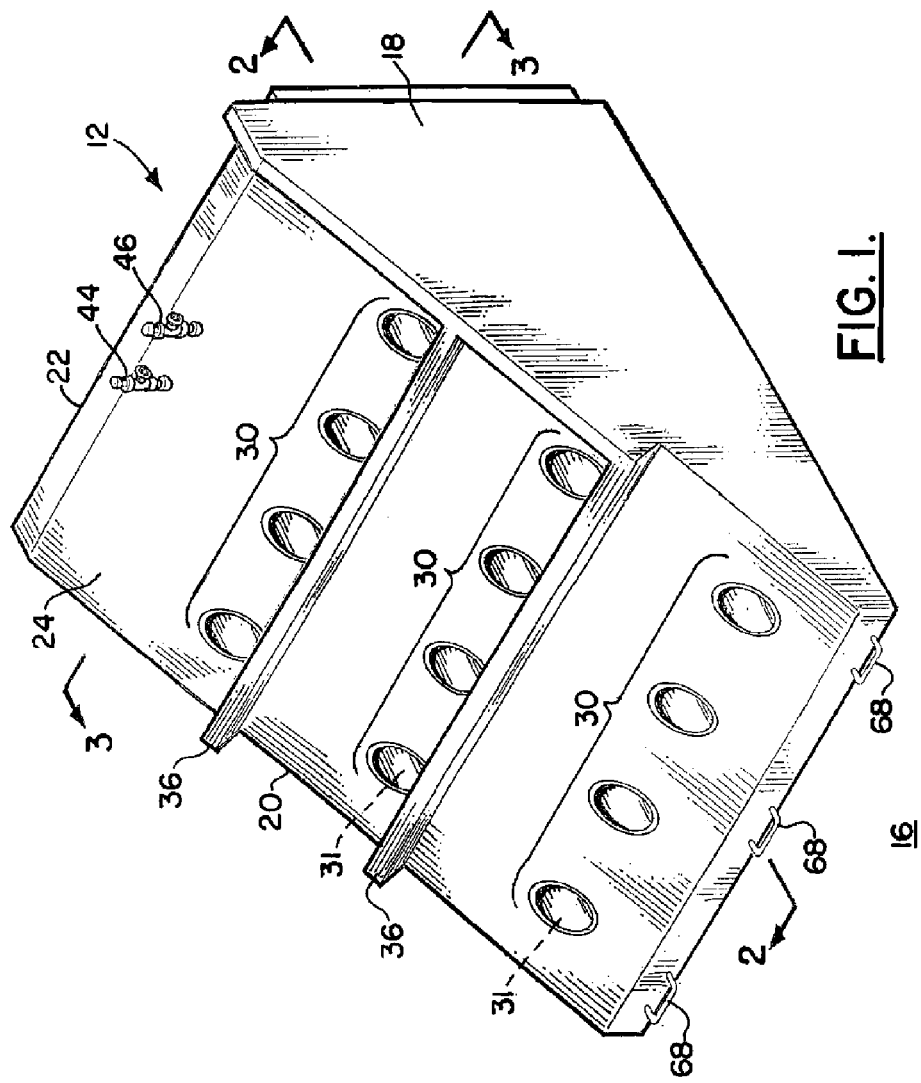
FIG. 1 is an overall perspective view of a section in the preferred embodiment of the WSSC System of the present invention.
Figure 2:
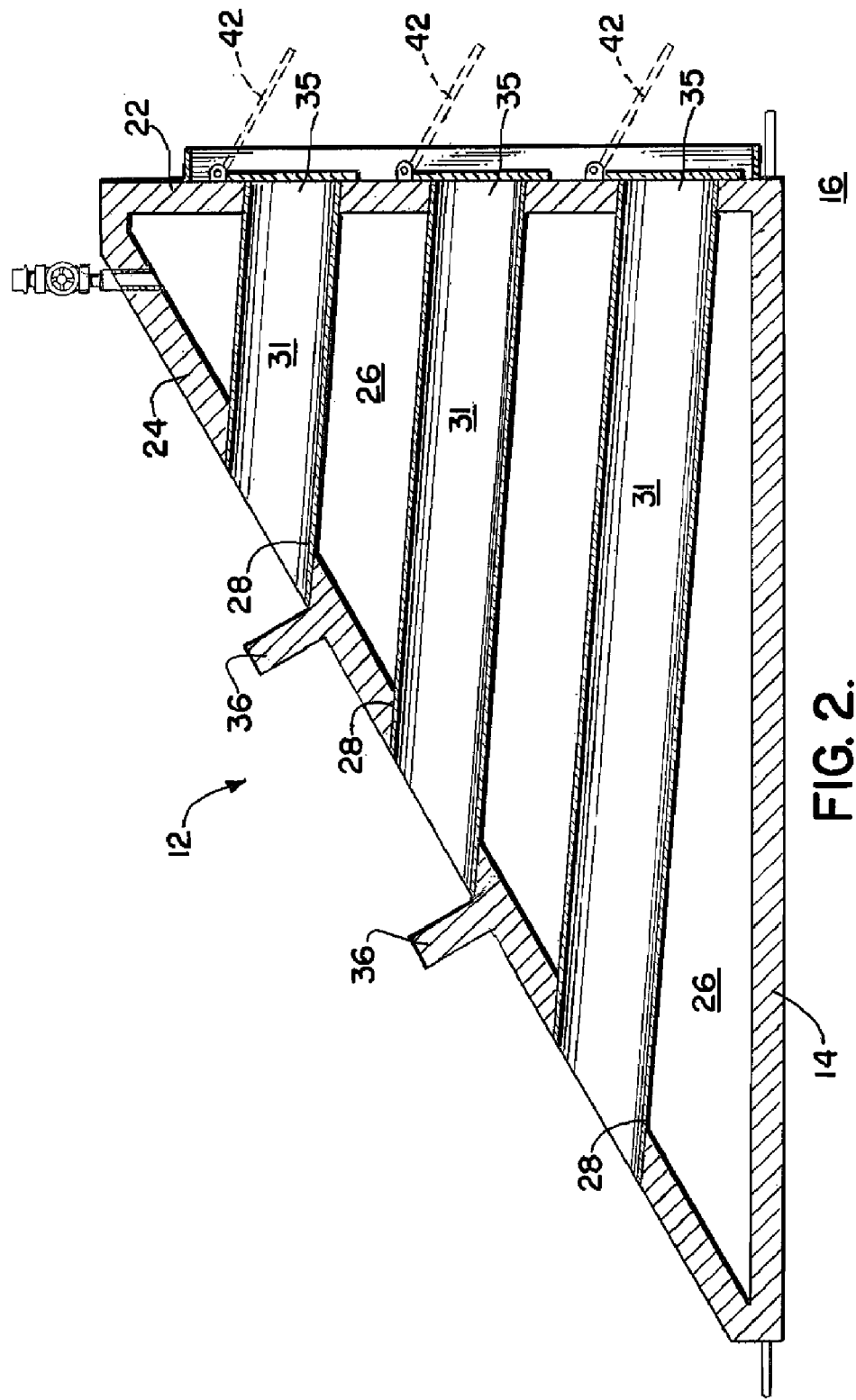
FIG. 2 is a side cutaway view along lines 2-2 in FIG. 1 of the preferred embodiment of the WSSC System of the present invention.
Figure 3:
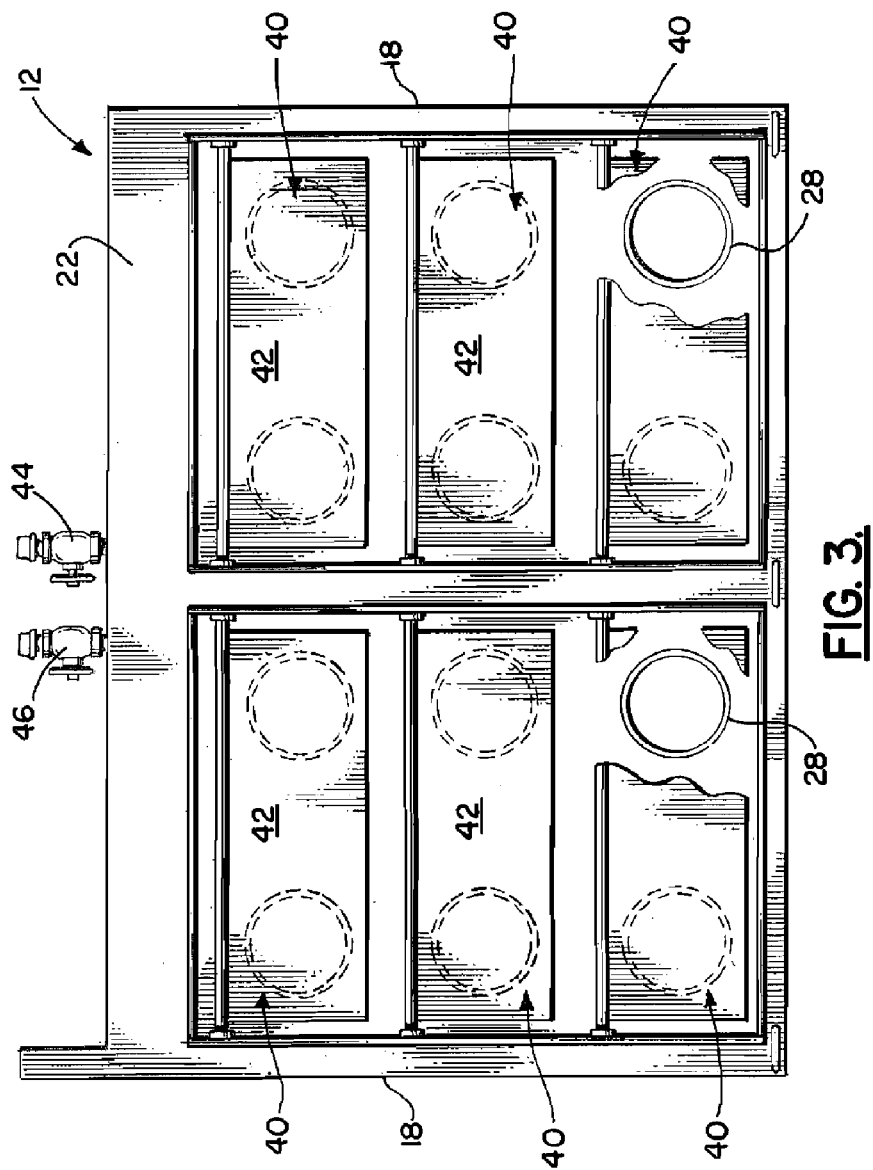
FIG. 3 is a rear partial cutaway view along lines 3-3 in the preferred embodiment of the WSSC System of the present invention.

The WSSC System 10 of the present invention comprises a plurality of sections 12 that will be more fully described in FIGS. 1 through 3. As illustrated, each section 12 includes a base 14 for resting on a sea floor 16. There is provided a pair of substantially triangular shaped side walls 18, 20 a rear wall 22 and sloped top wall 24, all together defining an interior space 26 therein. It is foreseen that each section 12 would be fabricated from a material, such as rubber, from discarded tires, or other material, such as high density poly ethylene (HDPE) or concrete, if necessary. Each section 12 further comprises a plurality of tubular members 28, such as PVC pipe having a certain diameter, preferably set in three rows 30, the tubular members 28 extending from the top wall 24, through the space 26 and terminating in the rear wall 22. Each tubular member has a flow bore 31 therethrough for allowing water 32 carrying sediment 34 (See FIG. 10, e.g.) to flow from a point in front of each section 12, through each tubular member 28, and exit through the rear opening 35 of each tubular member 28, through the rear wall 22 to a point to the rear of each section 12, into the area 37 between the system 10 and a shoreline, as will be described further. As seen in side view in FIG. 2, each tubular member 28 has a slight incline from its top wall 24 to the rear wall 22 to facilitate flow of water 32 and sediment 34 through each member 28. The upper and middle sections 12 include a shelf or shoulder 36 across the width of the top wall 24, but not the bottom section 12. It should be noted that shelf 36 could also be used on the first row if needed and would not cause scouring of sand or other sediment under the unit. An illustration where this is applicable is found in FIG. 25 where the rock jetty extends beyond the lower edge of each unit. In that figure, the rock jetty extends beyond the unit preventing a backwash.

The importance of the shoulder/shelf 36 cannot be overemphasized, and the effects it has on waves and how it helps in collection additional sediment. In the upward movement of a wave, the shelf 36 shears part of the wave, breaking up the wave and dispersing of some of the energy, while redirecting some of the wave energy, thus forcing water and sediment into the tubular member. Downward movement or retreating wave, shears part of the wave, breaking up the wave and dispersing of some of the energy, while redirecting some of the wave energy, thus forcing water and sediment into the tubular member. The shelf 36 also catches any additional sediment; i.e., sediment that did not flow in the tubular member will remain trapped because of the shoulder/shelf location to the tubular opening. The next wave will wash this additional sediment through the tubular member. The shoulder/shelf location and design makes the collection of sediment more efficient.

Each shelf 36 set below the second and third rows 30 of tubular members 28, as seen in FIG. 1, would catch any sediment 34 which did not flow into the tubular members 28, and would be washed through with the next wave of water 32. Also, as seen in FIG. 3, at the rear opening 34 of each tubular member 28 there is provided a one way flapper valve 40, of the type known in the industry, which would allow the water 32 carrying sediment 34 to exit the tubular member 28, but would not allow the water 32 and sediment 34 to return into the tubular member 28, once the valving member 42 of valve 40 closes. Finally, although this will be described more fully, each section 12 is provided with an inlet valve 44 and outlet valve 46 on its top wall 24 to allow water or other substance to be pumped into and out of the interior space 26, for reasons to be explained further.

Figure 4:
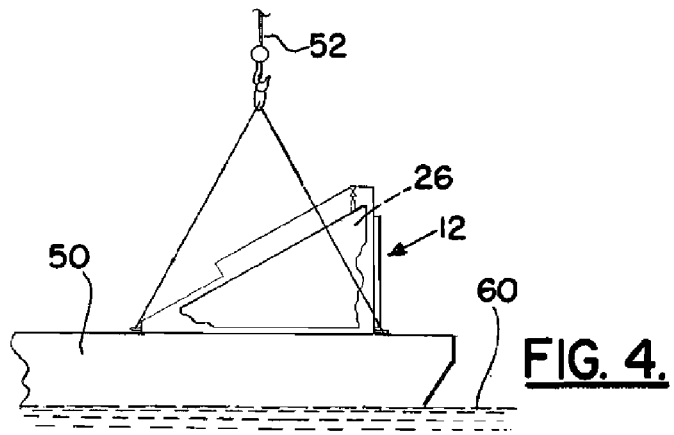
FIGS. 4 through 7 illustrate the method of installing the components of the WSSC System of the present invention.
Figure 5:
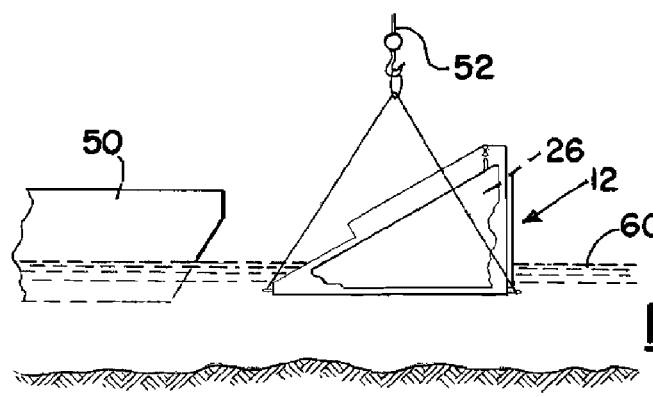
Figure 6:
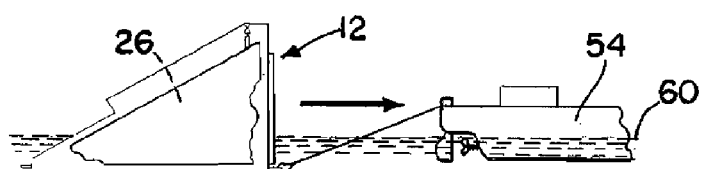
Figure 7:
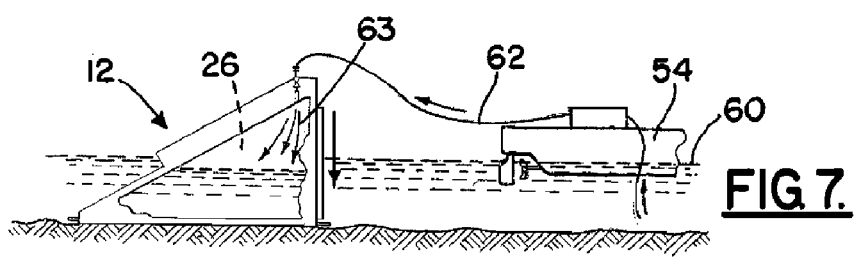

As was stated earlier, the WSSC System 10 is comprised of a plurality of sections 12 to make up the entire system along a shoreline or the like. FIGS. 4 through 7 illustrate the manner in which each section is placed on site in the body of water. In FIG. 4 there is seen a barge 50 carrying a typical section 12, as described above, the section 12 having the capability to be hoisted from the barge 50 by a crane on the barge 50. As seen in FIG. 5, the section 12 has been lifted from barge 50 by cable 52 and placed in the body of water 60, where because of the space 26 within the closed section 12, the section 12 is buoyant and able to float. Next, as seen in FIG. 6, a boat 54 would tow the section 12 to a desired point in the body of water 60. Once in place, a flow line 62 would be attached to the inlet valve 44 on section 12, and water or other fluid (arrows 63) would be pumped into the interior space 26 of a sufficient quantity in order to allow section 12 to rest on the sea floor 16. This process would be repeated for each section 12 brought on site.

Figure 8:
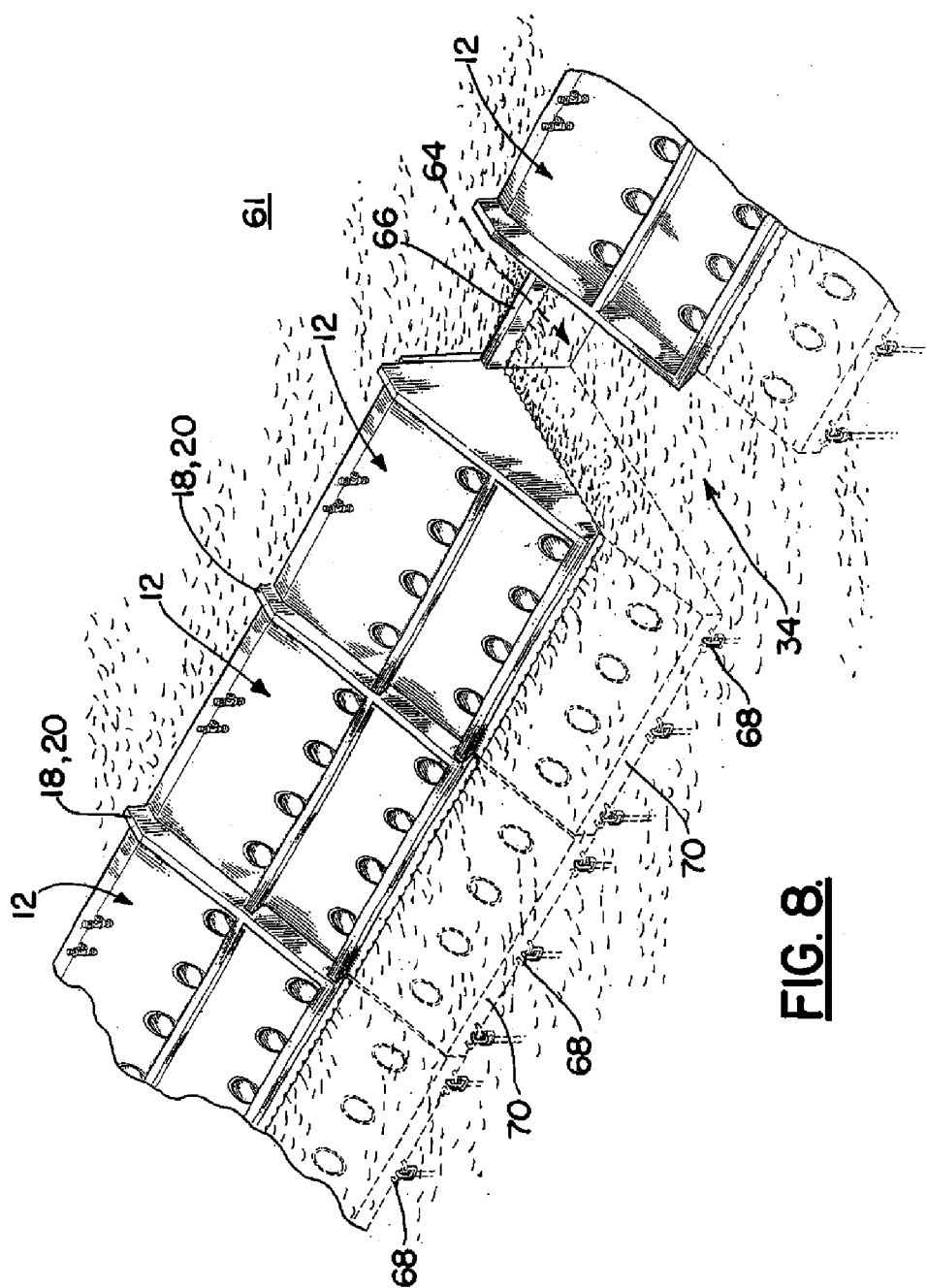
FIG. 8 is a partial overall view of the preferred embodiment of the WSSC System of the present invention being anchored in place while also illustrating water returning through the a weir between sections.

As will be described further, the multiple sections 12 would be attached to one another and anchored to the sea floor 16, as seen in FIG. 8. In this figure, there is provided a plurality of sections 12 attached to one another along their side walls 18, 20. It should be noted that since the water 32 carrying the sediment 34 is unable to return to a point in front of the section 12, due to the action of the one way flow valve 40 as described earlier, there must be a means by which the water 32 is allowed to return to the open sea 61, FIG. 8 illustrates a flow opening 64 set at intervals between multiple sections 12, the opening 64 including a weir 66 in place, so that the water 32 is able to flow over the weir 66 and return to the open sea 61, but the weir 66 prevents sediment 34 from being carried back into the open sea 61, so that the sediment is collected between the system 10 and the shoreline.

Figure 9:
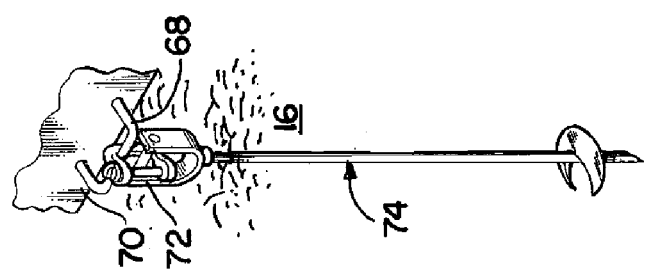
FIG. 9 illustrates a typical anchor utilized to anchor sections into the water bottom in the WSSC System of the present invention.

As seen also in FIG. 8, there is provided a system for anchoring the various sections 12 of the system 10 to the sea floor 16. As illustrated each section includes a plurality of anchor loops 68 along the front and rear bottom edges 70 of the top wall 24, which would serve to engage the top anchor portion 72 of an elongated anchoring member 74, as seen in FIG. 9, that would be bored into the sea floor 16, and once in place, as seen in FIG. 9, would be attached to each anchor loop 68, to hold each section 12 in place. As seen in FIG. 8, each section 12 would have preferably three anchor loops 68 along its front edge, and three along its rear edge, each loop secured to the anchor portion 72 of three members 74.

FIGS. 10 and 11 illustrate the manner in which the system 10 operates to suppress wave action while at the same time collecting sediment to the rear of the system 10. Periodic waves going over the units or sections are not necessarily harmful; these waves carry larger volumes of sediment meaning more sediment will be collected and recovered. As illustrated first in side cutaway view in FIG. 10, each section 12 while resting on the sea floor 16, the upper part 17 of the triangular shaped section 12, as seen in side view, is extending out of the water. This feature is important, since by extending out of the water, it will serve as a partial barrier or will serve to suppress the action of the wave 80 as the wave 80 flows by the system 10, which would be beneficial to the coast line by reducing or eliminating erosion of precious coast line.

While the system 10 is serving that function, its second and equally important function is also illustrated in FIGS. 10 and 11. As illustrated the water 32 in wave 80 crosses the system 10, the water 32 is carrying a certain quantity of sediment 34 stirred up from the sea floor 16. The water 32 and sediment 34 flow through the plurality of tubular members 28 and sediment is deposited to the area 84 of the sea to the rear of the system 10. As the waves 80 continue to flow over and through the system 10, more and more sediment 34 is collected in the area 84, and the water flows back to the sea through openings 64 formed in the system 10. As seen in FIG. 11, the sediment 34 has collected to a height where the lowermost tubular members 28 are completed blocked by the build up of sediment 34. This buildup may continue until the sediment 34 builds higher to a point where the flow through the members 28 could be completely blocked. This would be the point at which the system 10 would need to be moved further out from the shoreline if so desired.

This would be accomplished by removing the anchors 72 from each section, placing the flow line 62 onto the outlet valve 46 on each section 12, and pumping the fluid out of the interior 26 of each section 12. The section 12 would become buoyant once more, and the reverse steps would be taken as seen in FIGS. 4 through 7. The boat 54 would tow each section 12, where a cable would be attached to the section 12, which would then be lifted onto a barge 50 and floated to the next destination. If the destination were close by, the boat 54 could simply tow the section 12 to the location without having to lift the section 12 onto a barge 50. Then steps 4 through 7 would be repeated in placing each section 12 at its new location, where together the sections 12 would form a new system 10 within the body of water.

Following the discussion of the manner in which the system 10 operates, reference is made to FIG. 12A, where an entire system 10 has been anchored in place to the sea floor 16 and along a shoreline 15, with both ends 11 of the system 10 anchored to the shoreline 15, to encompass a certain area of a bay or water inlet. In FIG. 12, the system 10, in its operation, as will be described below, is seen with the plurality of sections 12, secured side by side, with openings 64 placed between multiple sections 12, to allow the tide to return to the sea, through the openings 64, and each opening 64 having a weir 66 in place to stop sediment 34 to return to the open sea. So, in effect, the system 10, is operating to collect sediment 34 in the water between the system 10 and the shoreline 15, while at the same time suppressing the wave action which damages the coastline. It should be made clear that the system 10, for example, as seen in FIG. 12, could be arranged in a different configuration other than a straight line, side by side, so as to take advantage of currents as well as wave actions in a particular body of water.

Figure 12B:
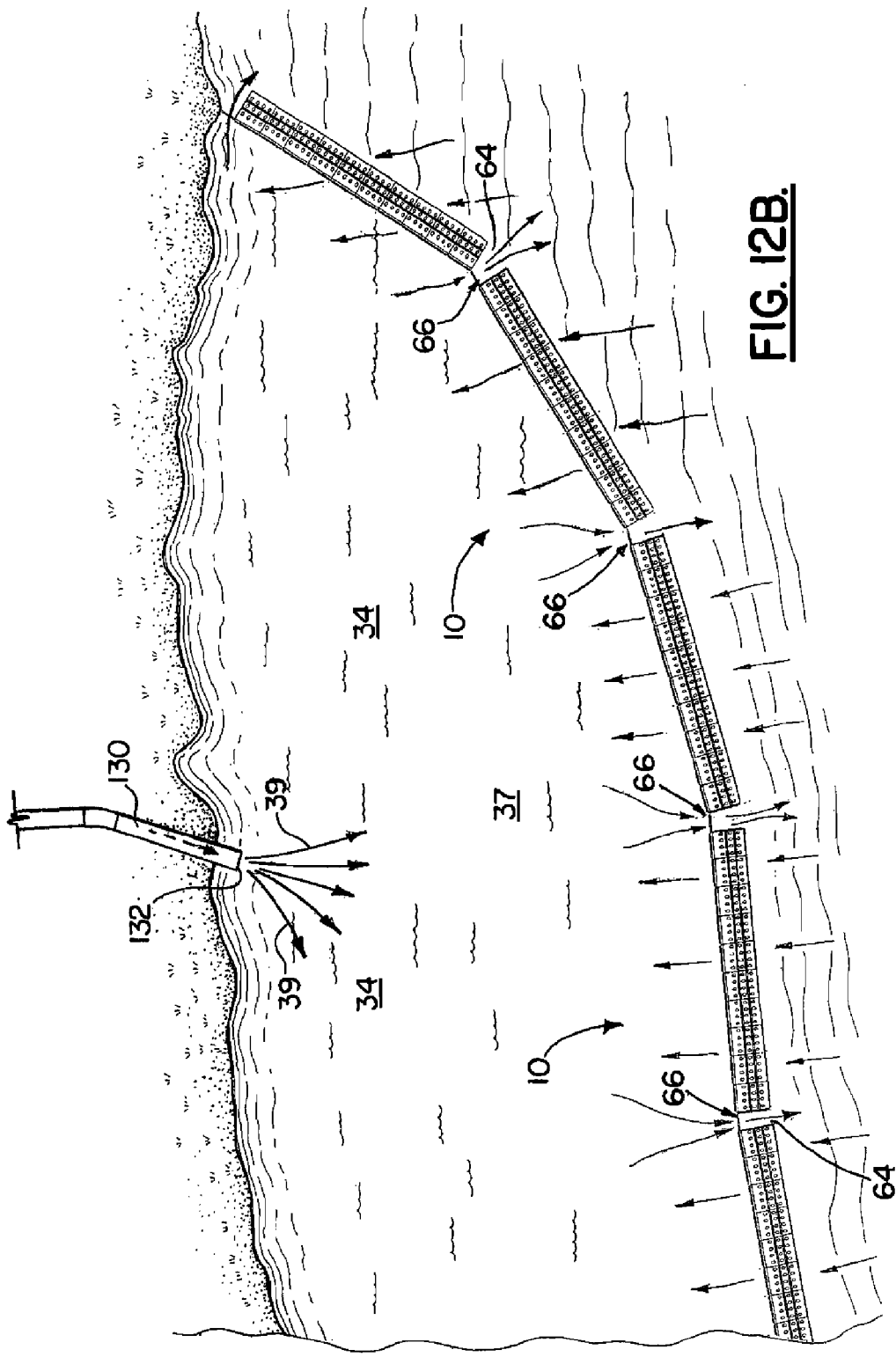
FIG. 12B is an aerial view of the WSSC System in place along a shoreline in a body of water with sediment being pumped in via a pipe from the shore.
Figure 13:
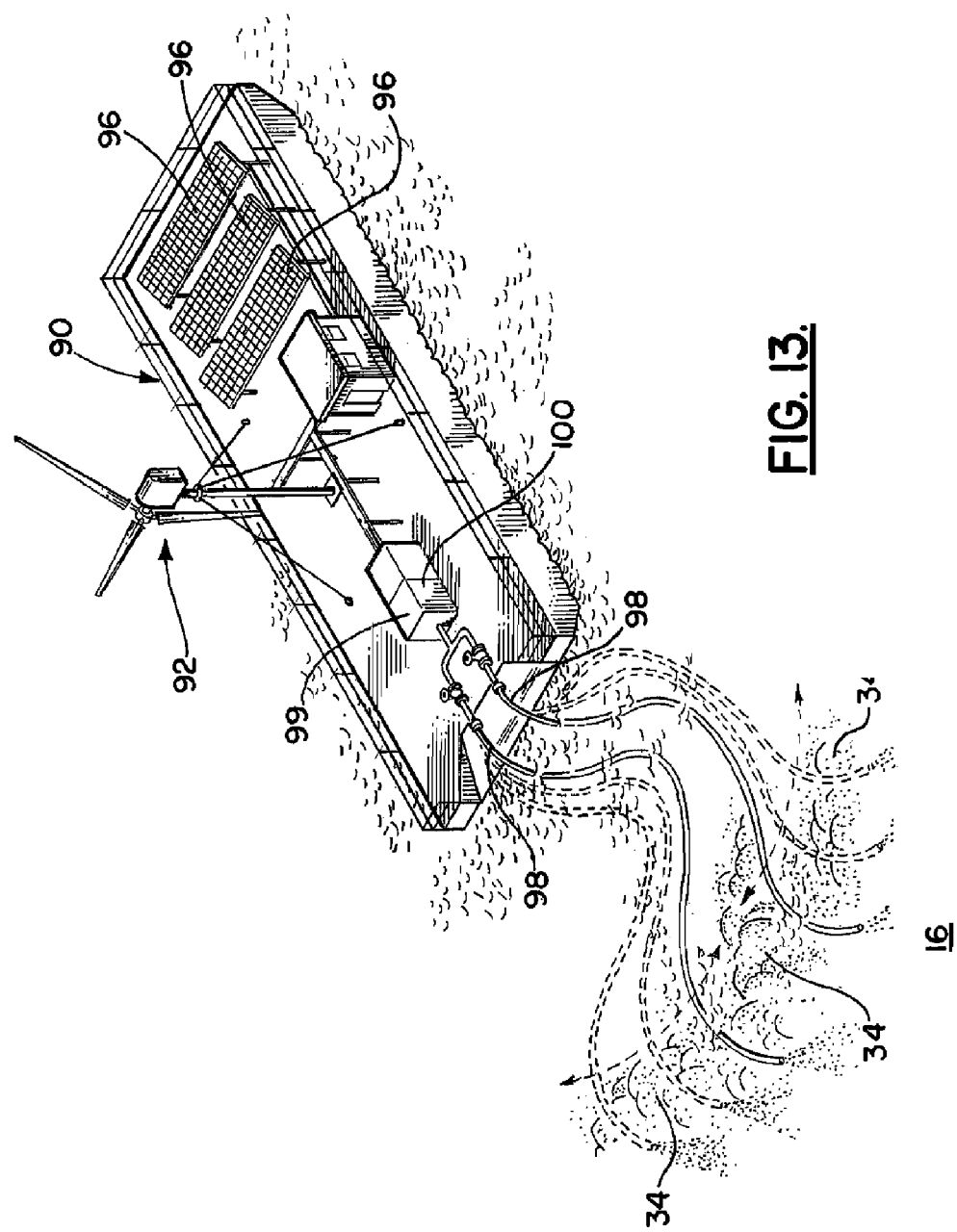
FIG. 13 is an overall view of a system utilized to stir up sediment to be carried by the water through the WSSC System of the present invention.

Another feature of the system's operation is seen in FIG. 12B. As seen in this figure, the system 10 is in place as described in FIG. 12A. However, here there is a pipe 130 which is delivering sediment 34 being pumped from a location inland and flowing from the end 132 of pipe 130 into the bay or inlet, as seen by arrows 39. With the system 10 in place, the sediment is captured within the confines of the system 10, within area 37, and will not escape, although water flow will continue through the spaces 64 where the weirs 66 are in place. Therefore, not only is sediment 34 being deposited from the normal wave action of the sea, but also additional sediment 34 is being pumped in and kept in place by the barrier formed by system 10.

Returning now to the system 10, as was stated earlier, a most important aspect of this system 10 is the collection of sediment 34 to help rebuild an eroded coastline or other sea area. To facilitate that function, further, reference is made to FIGS. 13 through 15. In these figures there is seen a system for providing a greater quantity of buoyant sediment 34 in the water which will be flowing through the system toward the coastline. As illustrated first in FIG. 13, there is provided a specially equipped barge 90 which would include components that would be powered by wind and solar power. There is provided a windmill 92 on the barge which would be of the type to provide power to be stored in batteries for powering equipment on the barge 90. There would also be provided a bank of solar panels 96, again to supply a source of power to be stored in batteries for powering equipment on the barge. The barge 90 would include generators which would power air compressors 99 for compressing air into storage tanks 100. The storage tanks 100 would have a plurality of air lines 98 extending from the barge 90 to the sea floor 16. There would be an automatic system for releasing the compressed air from the tanks 100 through the lines 98 to exit at nozzles at the end of the lines 98. The compressed air being released would stir up the sediment 34 on the sea bed 16, which would allow the waves 80 to carry a great quantity of additional sediment 34 through the system 10 to be deposited at an even greater rate. Since the barge system is automatic, the flow of air would be triggered by timers or the like, and would be shut off so that the air compressors 99 could re-fill the tanks 100 with compressed air. The barge 90, of course, could change locations as needed for the system 10 to gain maximum use of the flow of additional sediment 34 through the system 10.

FIG. 14 illustrates an aerial view of the system 10 using the specially equipped barge 90 in inducing the flow of additional sediment 34. As illustrated, while the barge 90 is being used, there would be provided a net 102 in place around the outer perimeter of the system 10, with the net 102 held in place by a plurality of spaced apart anchored buoys 104, of the type illustrated in FIG. 15, so that water 32 and sediment 34 flow through the net 102, but sea life is prevented from moving into the area where it could be injured or killed by the air flow lines operating on the floor 16 of the sea. It should be made clear that in place of net 102 there could be provided a sediment barrier set in place, of the type commercially available in the art.

Figure 16:
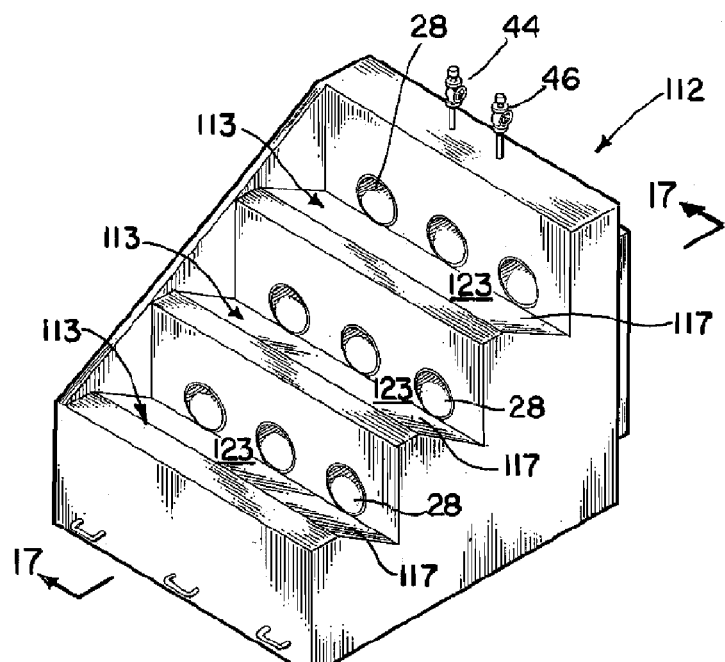
FIG. 16 is an overall view of an alternative embodiment of a section used in the WSSC System of the present invention.
Figure 17:
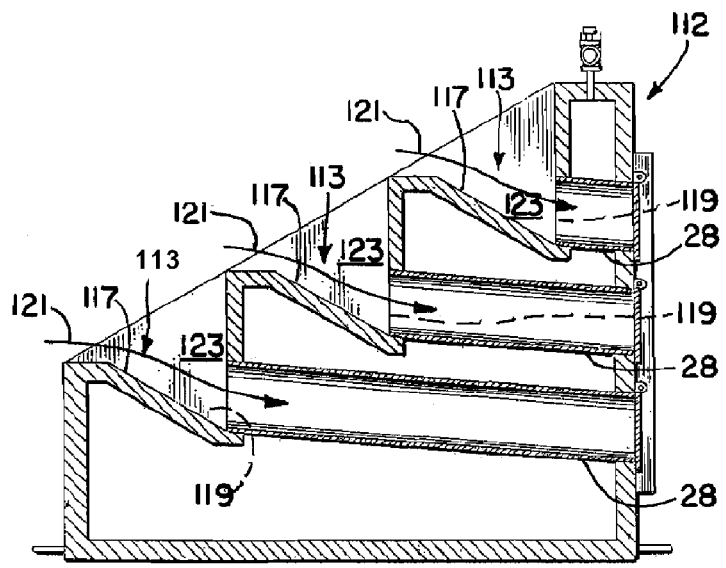
FIG. 17 is a side cutaway view of the alternative embodiment of a section taken along lines 17-17 in FIG. 16.

While the system 10 as described above is very capable of achieving the ends desired, it is foreseen that each section 12 may be configured slightly different than that as illustrated in FIGS. 1 through 3. Reference is made to FIGS. 16 and 17, where there is illustrated a section 112, where the top wall 26 of the section 112 has been changed from the flat top wall 26 of section 12 as seen in FIG. 1, to a series of steps 113, where the floor 117 of each step 113 would be slated down to the entry 119 of each tubular member 28. Therefore, as water 32 and sediment 34 would wash across each section 112, the water 32 and sediment 34 would flow down along the floor 117 of each step 113, in the direction of arrows 121, so that the area 123 at the entrance of each tubular member 28 would serve as a collection area for sediment 34, until the sediment 34 is carried into and through the tubular members 28 by the next wave or tidal action. This configuration would provide greater assurance that the maximum amount of sediment 34 is being captured at the front of the section 112, so that it can be moved through the members 28 to the rear of the section 112 for greater building of sediment were desired.

Figure 19:
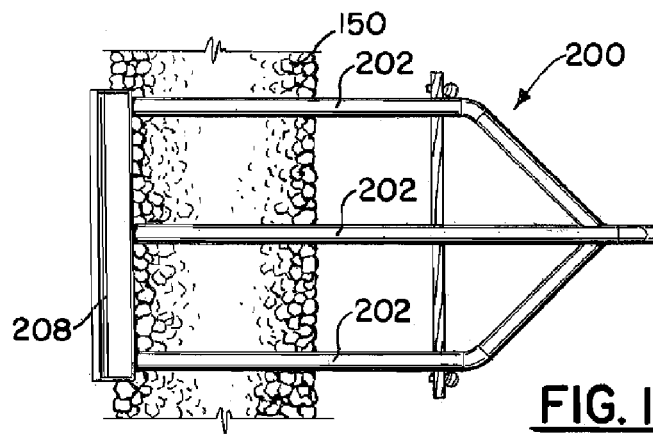
Figure 20:
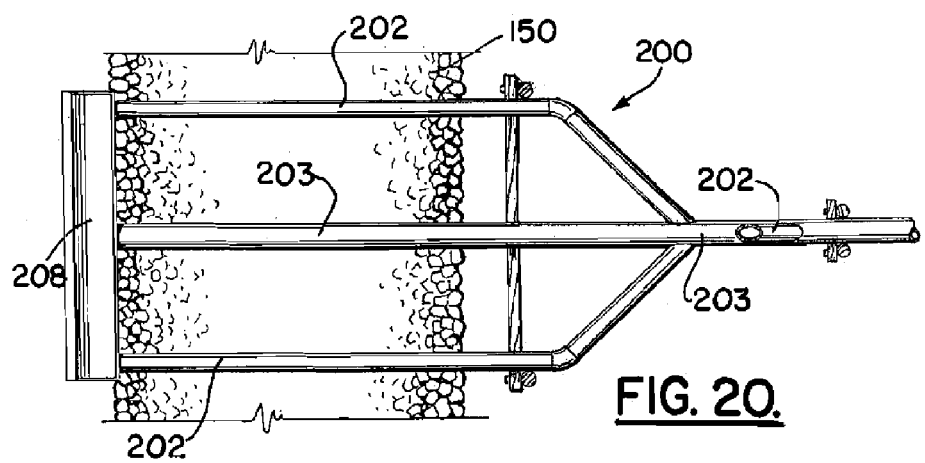
Figure 21:
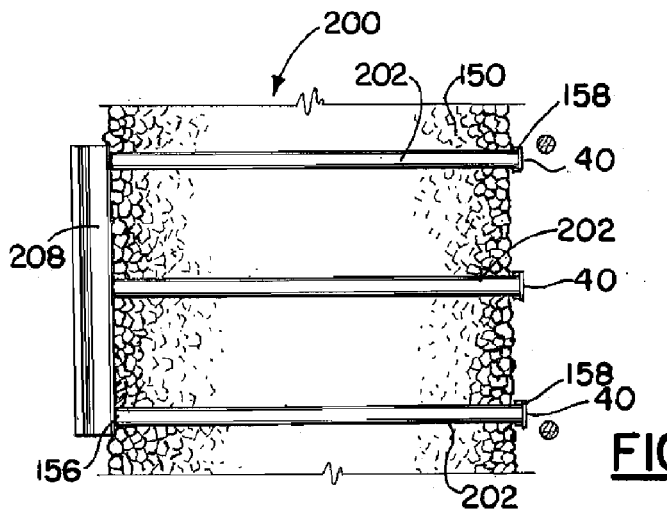
Figure 22:
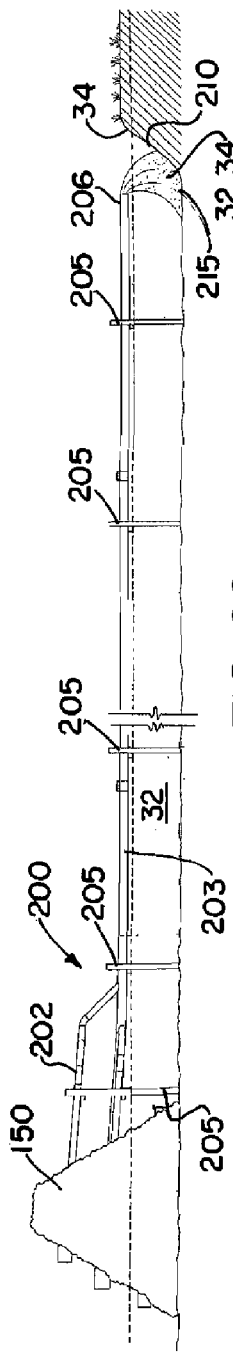
Figure 23:
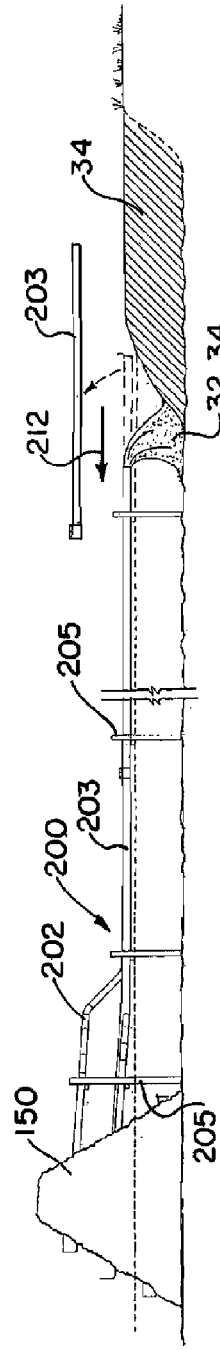
Figure 24:
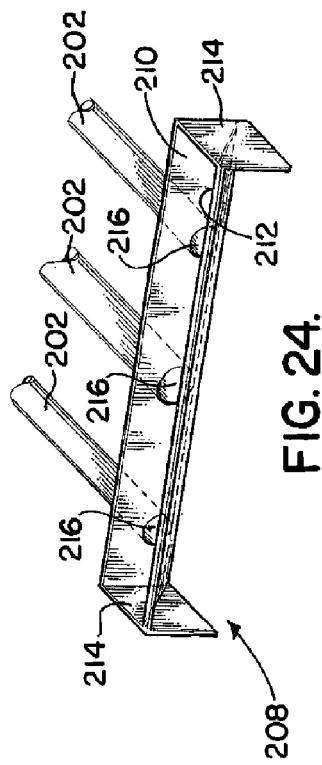

Reference is now made to FIGS. 18 through 24, where an embodiment of the WSSC System, labeled System 200 is incorporated into a rock jetty 150, of the type which has been constructed to block the entrance to the waterway referred to as Mr. Go in South Louisiana. As illustrated in top views in FIGS. 19 through 21, there is provided a rock jetty 150 into which the system 200 is incorporated. In FIG. 21, taken along lines 21-21 in FIG. 18, it is foreseen that the base 152 of the jetty 150 would be laid in place, and then a plurality of elongated pipes 202 would extend from the forward point 156 of jetty 150, in this case three pipe sections 202 to the rear point 158 of rock jetty 150. At the forward point 156, the three pipes 202 would extend from a trough 208, as illustrated in FIG. 24, having an upright rear wall 210, a angulated floor 212, and a pair of side walls 214, so that the trough 208 would serve to capture the flow or water 32 carrying sediment 34, and the angulated floor 212 would direct the water and sediment into the entrance 216 to the pipes 202 more efficiently, to be carried to the rear of the jetty 150. The pipe sections 202 in this lower level of pipes 202 would terminate and dump water 32 and sediment 34 to the rear of the jetty 150, and each pipe would be equipped with a flapper valve 40 to maintain the sediment 34 in place.

Figure 18:
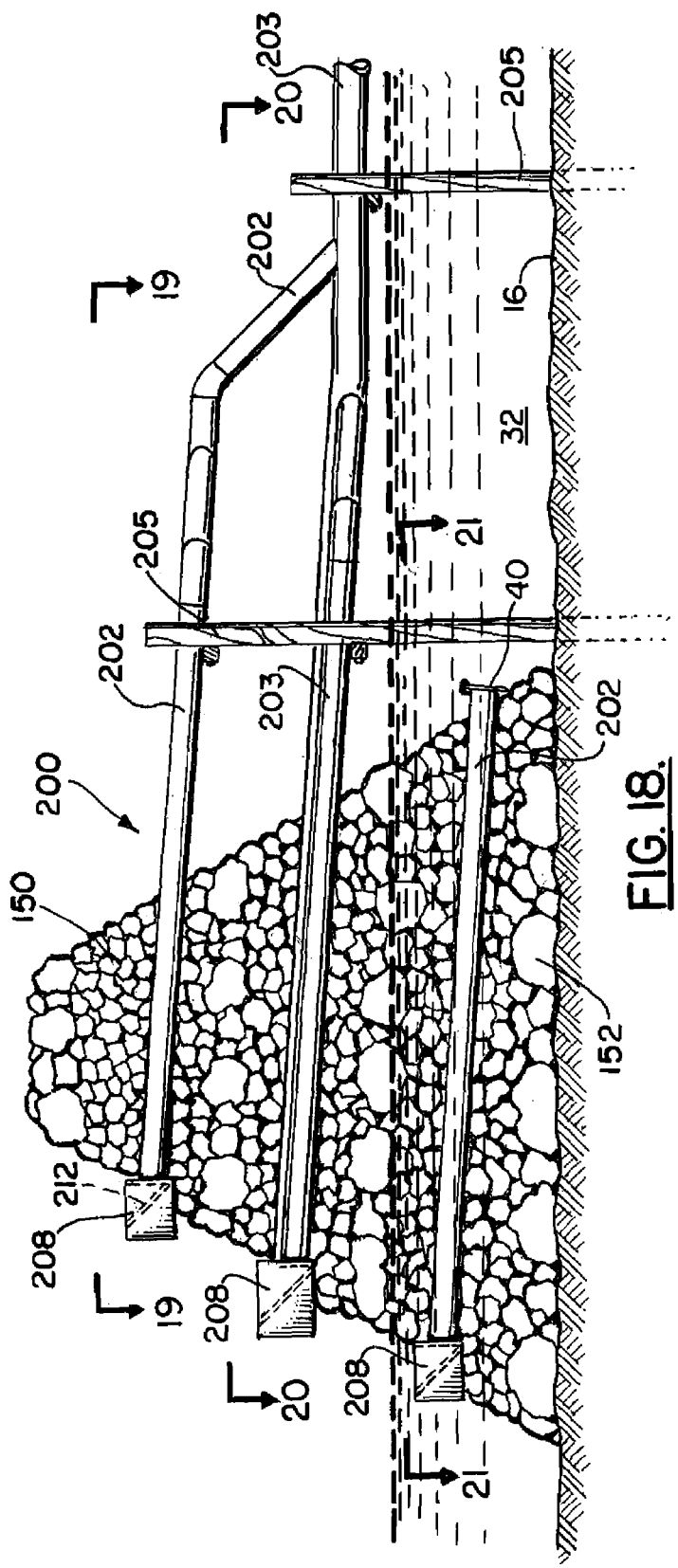
FIGS. 18 through 24 illustrate the principal embodiment of the WSSC System of the present invention as it would be installed to function positioned through a rock jetty.

FIG. 20 illustrates the second level of pipes as shown along lines 20-20 in FIG. 18. This second or middle level of pipes 202 would capture water 32 and sediment 34 in the same manner as described in FIG. 21, but in this case, the pipes 202 would all diverge and empty into a principal flow pipe 203, somewhat larger in diameter, to carry the water and sediment further to the rear of jetty 150, as will be described further.

FIG. 19 illustrates the three pipes 202 at the upper most level in jetty 150, as seen along lines 19-19 in FIG. 18. This group of pipes 202 would also collect water 32 and sediment 34 in the same manner as the lower and middle sections. However, because the upper section of pipes 202 are positioned higher, the pipes 202 would be diverted downward, as seen in FIG. 18, to dump into the principal flow pipe 203 to be carried rearward, also.

In FIG. 22 there is illustrated WSSC System 200 in side view where the principal pipe 203, as described earlier, is extending rearward to a predetermined distance, and is supported in its path by a plurality of upright piers or pilings 205, until the rear end 206 of the pipe reaches its destination. In this embodiment, the pipe 203 is carrying water 32 and sediment 34 to a point 215 where sediment 34 has been deposited earlier. Therefore, additional sediment 34 will be dumped so as to continue to build up sediment in the direction of arrow 216. As seen in FIG. 23, once the pipe 203 has deposited sediment at its end to the height desired, a section of principal flow pipe 203 is removed, and the sediment 34 will continue to dump sediment 34 so that the sediment buildup continues to fill the gap between the furthest point from the jetty 150, until theoretically, sediment 34 is built up to the base of jetty 150. Since in the case of the waterway Mr. Go, not only would the waterway be closed via the rock jetty 150, but with this system 200 in place, the entire body of water between the jetty 150 and the far end of the Mr. Go waterway, could be filled with sediment 150, simply through the constant wave action of the sea. The result is the rebuilding of valuable coastline which has been eroded away in the past.

Although FIGS. 18 through 24 illustrate the preferred embodiment for establishing the WSSC System through a rock jetty 150, it is foreseen that the WSSC System 10 as described in FIGS. 1 through 17 could be placed within a rock jetty 150, as seen in FIG. 25. When the system 10 is placed within a rock jetty it may be required that the system is anchored in place so that the strong storm currents won't dislodge the units. An additional shoulder/shelf 36 could be used in this configuration because it would not cause a backwash below the base of the rock jetty. The base of the rock jetty protrudes beyond the base of the unit preventing the backwash from developing. Rather than the water 32 entering the trough 208, there would be provided a plurality of sections 12, as previously described, for receiving the water 32 and sediment 34 into flow pipes 28, and the rear end of each section 12, rather than having a valve 40, the water 32 carrying sediment 34 would flow into flow pipes 202, which would then flow into principal pipe 203, and the system would operate in the manner as described in FIGS. 18 through 24. Although FIG. 25 illustrates the units set up in pairs which are spaced apart, it is foreseen that a plurality of two or more units in a group could be set along the rock jetty.

In the principal embodiment of the system 10, as described in FIGS. 1 through 17, it is foreseen that each section is constructed of a buoyant type material, such as rubber from old tires; that each section would be approximately 12 feet long and 12 feet wide, with the rear wall approximately 6 feet at its highest point, and the front wall angulated to be around 13.5 feet in length. The pipes would be preferably PVC material, and would be around 1 foot in diameter.

The following is a list of parts and materials suitable for use in the present invention.

| PARTS LIST | |
|---|---|
| Part Number | Description |
| 10 | WSSC System |
| 12 | section |
| 14 | base |
| 15 | shoreline |
| 16 | sea floor |
| 17 | upper part |
| 18, 20 | side walls |
| 22 | rear wall |
| 24 | top wall |
| 26 | interior space |
| 28 | tubular members |
| 30 | rows |
| 31 | flow bore |
| 32 | water |
| 34 | sediment |
| 35 | rear opening |
| 36 | shoulder/shelf |
| 37 | space |
| 39 | arrows |
| 40 | flapper valve |
| 42 | valving member |
| 44 | inlet valve |
| 46 | outlet valve |
| 50 | barge |
| 52 | cable |
| 54 | boat |
| 60 | body of water |
| 61 | open sea |
| 62 | flow line |
| 63 | arrows |
| 64 | flow opening |
| 66 | weir |
| 68 | anchor loop |
| 70 | bottom edge |
| 72 | top anchor portion |
| 74 | elongated anchoring member |
| 80 | wave |
| 84 | area |
| 90 | barge |
| 92 | windmill |
| 96 | solar panel |

-continued

PARTS LIST

| Part Number | Description |
| --- | --- |
| 98 | air line |
| 99 | air compressor |
| 100 | storage tank |
| 102 | net |
| 104 | buoy |
| 112 | section |
| 113 | step |
| 117 | floor |
| 119 | entry |
| 121 | arrow |
| 123 | area |
| 130 | pipe |
| 132 | end |
| 150 | rock jetty |
| 152 | base |
| 154 | exit pipe |
| 156 | forward point |
| 158 | rear point |
| 200 | WSSC System |
| 202 | elongated pipes |
| 203 | principal flow pipe |
| 205 | pilings |
| 206 | rear end |
| 208 | trough |
| 210 | rear wall |
| 212 | angulated floor |
| 214 | side walls |
| 215 | point |
| 216 | entrance |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A transportable wave suppressor and sediment collection (WSSC) system positionable along a coastline of a body of water, comprising:
   a. a plurality of sections, each section further comprising:
      i. at least a forward wall, a rear wall, a base and two sidewalls to define a closed space therein;
      ii. a plurality of rows of flow pipes declining from the horizontal between the front and rear walls for allowing water containing sediments to flow therethrough;
      iii. shelves extending out from the forward wall below the plurality of rows of flow pipes for dispersing some wave energy contacting the forward wall to allow sediment to flow into the flow pipes and for collecting sediment that is not carried into the flow pipes and settles on the shelf for being contacted by a following wave to carry the sediment into the flow pipes;
      iv. a one way valving element positioned on the rear end of each flow pipe, for allowing the water containing sediments to exit the pipe at the rear wall, but preventing the water and sediments from returning through the flow pipes;
   b. means for allowing each section to be filled with material, in the closed space in order for each section to sink and rest on a floor of the body of water;
   c. means for anchoring each multi-section to the floor of the body of water;
   d. means between multiple sets of sections for allowing water flow to return to the body of water but to maintain the sediment in place.

2. The system in claim 1, wherein each section is comprised of a substantially buoyant material which allows the section to float in the water before the section is filled with material comprising water or the like.

3. The system in claim 1, wherein each section is comprised of concrete which requires the section to be carried to the site via a barge and lifted from the barge by a crane and lowered into the water since the section is not able to float due to its weight.

4. The system in claim 1, wherein the flow pipes comprise sections of PVC material pipes in predetermined lengths.

5. The system in claim 1, wherein the means for allowing each section to be filled with the material comprises an inlet valve capable of receiving material into the section and an outlet valve for venting.

6. The system in claim 1, wherein each section is connected to one or more adjacent sections along the side walls of the respective sections in a conventional manner.

7. The system in claim 1, wherein each section further comprises a plurality of anchor loops which are engaged by a vertical anchor set into the seabed to secure each section in place.

8. The system in claim 1, wherein the means for allowing water to return to the sea yet maintain the sediment in place comprises openings between multiple sets of sections, and including a weir, so that the water flows through the openings, but the sediment is trapped by the weir.

9. The system in claim 1, further comprising an air delivery system in front of the WSSC system, the air delivery system comprising a plurality of air lines delivering compressed air under pressure into the water for stirring up additional sediment to be carried by wave action through the WSSC system.

10. A transportable wave suppressor and sediment collection (WSSC) system positionable along a coastline of a body of water, comprising:
   a. a plurality of sections, each section further comprising:
      i. at least a forward wall, a rear wall, a base and two sidewalls to define a closed space therein;
      ii. a plurality of rows of flow pipes declining from the horizontal between the front and rear walls for allowing water containing sediments to flow therethrough;
      iii. shelves extending out from the forward wall below the plurality of rows of flow pipes for dispersing some wave energy contacting the forward wall to allow sediment to flow into the flow pipes and for collecting sediment that is not carried into the flow pipes and settles on the shelf for being contacted by a following wave to carry the sediment into the flow pipes;
      iv. a one way valving element positioned on the rear end of each flow pipe, for allowing the water containing sediments to exit the pipe at the rear wall, but preventing the water and sediments from returning through the flow pipes;
   b. means for allowing each section to be filled with material in the closed space in order for each section to sink and rest on a floor of the body of water;
   c. a weir formed between multi-sections for allowing water to return to the body of water after flowing through the system but preventing most sediment flow to return resulting in sediment buildup between the system and the shoreline;
   d. an air delivery system in front of the WSSC system, comprising a plurality of air lines delivering compressed air under pressure into the water for stirring up additional sediment to be carried by wave action through the WSSC system.

11. The system in claim 10, wherein each section is comprised of a substantially buoyant material which allows the section to float in the water before the section is filled with material.

12. The system in claim 10, wherein the flow pipes comprise sections of PVC material pipes in predetermined lengths.

13. The system in claim 10, wherein the means for allowing each section to be filled with material comprises an inlet valve capable of receiving material into the section.

14. The system in claim 10, wherein a forward end of each section comprises a series of steps, having a floor angulated toward pipe openings to direct the water and sediment into the pipes more efficiently.

15. The system in claim 10, wherein each upper wall of each section comprises a shoulder member for trapping sediment on a face at an entrance point of the pipes, to wash the sediment through the pipes.

16. A method of establishing a system to suppress wave action against a shoreline and collect sediment to build up the shoreline, comprising the following steps:
   a. providing a plurality of body sections, each section, having a closed interior space and having a plurality of rows of flow pipes extending between a front wall and rear wall of each section;
   b. forming shelves extending out from the front wall below the plurality of rows of flow pipes for dispersing some wave energy contacting the forward wall to allow sediment to flow into the flow pipes and for collecting sediment that is not carried into the flow pipes and settles on the shelf for being contacted by a following wave to carry the sediment into the flow pipes;
   c. placing each section onto a vessel, and transporting each section to a predetermined point within a body of water;
   d. lowering each section into the water and towing each section to a desired location;
   e. pumping fluid material, such as water, into the interior space of each section so that the section sinks and rests on the water bottom, with a portion of each section extending above a surface of the water;
   f. repeating steps a through d until multiple sections are in place on the water bottom;
   g. interconnecting the sections and anchoring the sections to the water bottom;
   h. allowing water return gaps between the multiple sections for allowing the water flowing through the sections to return to sea, while trapping the sediment;
   i. allowing water carrying sediment to flow through wave action through the pipes in each section and trapping the sediment behind the sections until sufficient sediment is deposited in place; and
   j. preventing the water from flowing back through the openings in each section to the body of water in order to trap the sediment.

17. The method in claim 16, wherein the WSSC system can be transported to other locations to build up sediment at selected locations.

18. The method in claim 16, wherein the step of preventing the water from flowing back through the openings in each section to trap the sediment comprises one-way flapper valves at the rear end of each flow pipe, so that the sediment is prevented from flowing back into the open sea by a weir constructed at each water return gap.

19. A transportable wave suppressor and sediment collection (WSSC) system positionable along a coastline of a body of water, comprising:
   a. a plurality of sections, each section further comprising:
      i. at least a forward wall, a rear wall, a base and two sidewalls to define a closed space therein;
      ii. a plurality of rows of flow pipes of uniform diameter declining from the horizontal between the front and rear walls for allowing water containing sediments to flow therethrough;
      iii. shelves extending out from the forward wall below the plurality of rows of flow pipes for dispersing some wave energy contacting the forward wall to allow sediment to flow into the flow pipes and for collecting sediment that is not carried into the flow pipes and settles on the shelf for being contacted by a following wave to carry the sediment into the flow pipes;
      iv. a one way valving element positioned on the rear end of each flow pipe, for allowing the water containing sediments to exit the pipe at the rear wall, but preventing the water and sediments from returning through the flow pipes;
   b. a plurality of anchor loops on each section engaged by a vertical anchor set into the seabed to secure each section in place to the floor of the body of water;
   c. a wier extending between and engaging multiple sets of sections to define a means for allowing water flow which has flowed through the plurality of flow pipes to flow over the wier and return to the body of water while the sediment remains in place; and
   d. an air delivery system is positioned in front of the plurality of sections of the WSSC system, comprising a plurality of air lines delivering compressed air under pressure into the water for stirring up additional sediment to be carried by wave action through the plurality of flow pipes to the rear of the WSSC system.

* * * * *